United States Patent [19]
Caprioglio

[11] Patent Number: 5,811,750
[45] Date of Patent: Sep. 22, 1998

[54] DEVICE FOR WELDING MOTOR-VEHICLE BODIES OR SUB-ASSEMBLIES THEREOF

[75] Inventor: Luigi Caprioglio, Rivoli, Italy

[73] Assignee: Stola S.p.A., Turin, Italy

[21] Appl. No.: 597,124

[22] Filed: Feb. 6, 1996

[51] Int. Cl.$^6$ ................................................. B23K 11/06
[52] U.S. Cl. .............................................. 219/81; 219/82
[58] Field of Search ........................... 219/81, 82, 86.1, 219/86.23, 86.24

[56] References Cited

U.S. PATENT DOCUMENTS

| | | | |
|---|---|---|---|
| 3,920,950 | 11/1975 | Caprioglio | 219/88 |
| 4,652,719 | 3/1987 | Fujita et al. | 219/82 |
| 5,010,226 | 4/1991 | Rato et al. | 219/81 |
| 5,142,118 | 8/1992 | Schlatter | 219/121.63 |

*Primary Examiner*—Matthew V. Nguyen
*Attorney, Agent, or Firm*—Sughrue, Mion, Zinn, Macpeak & Seas, PLLC

[57] ABSTRACT

A robot for welding motor-vehicle bodies or subassemblies thereof is provided with a head for carrying out wire resistance seam weldings. The welding head includes a pair of counter-rotating welding rollers through which an electric current is passed. A copper wire is fed continuously around the welding rollers.

19 Claims, 10 Drawing Sheets

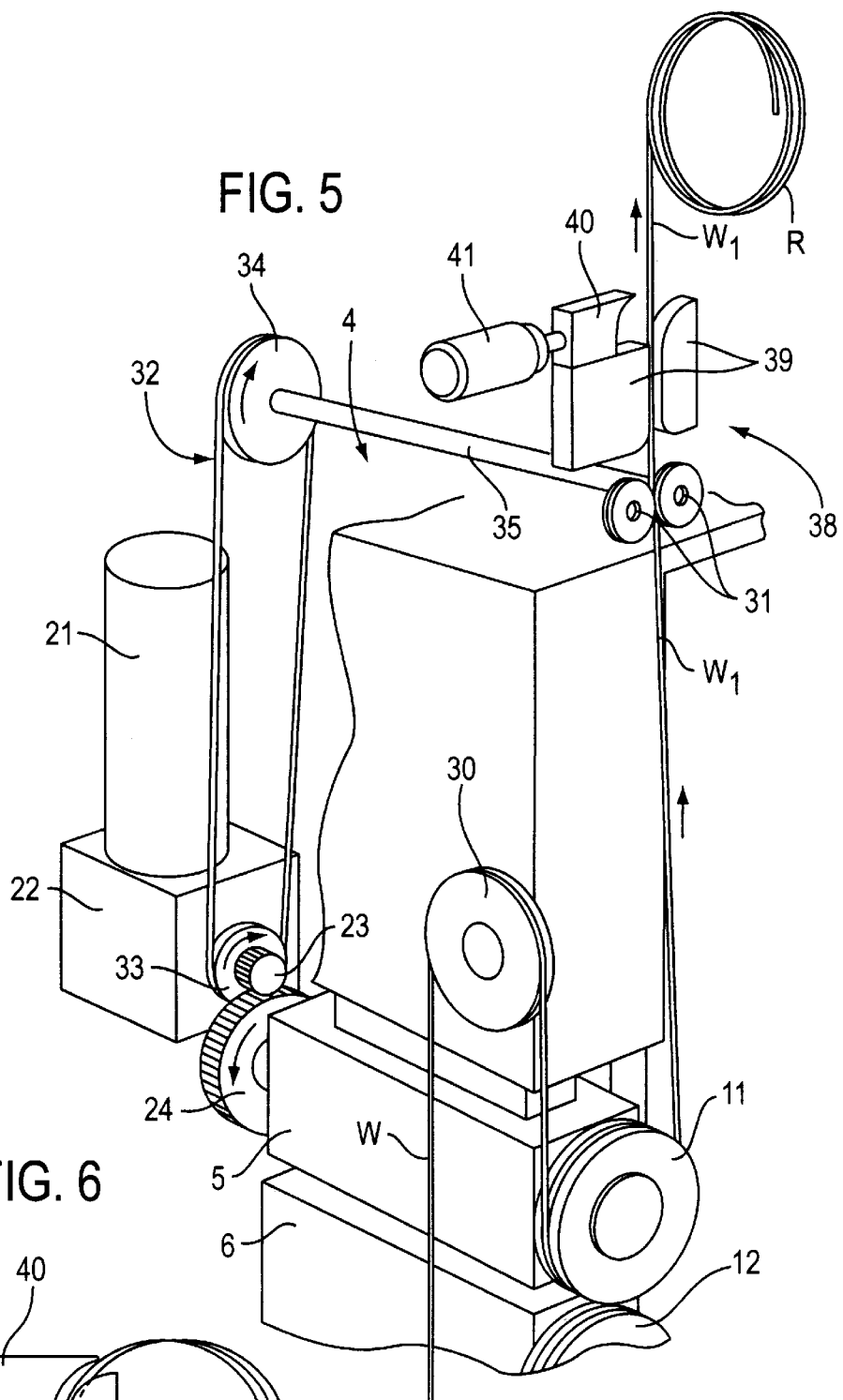
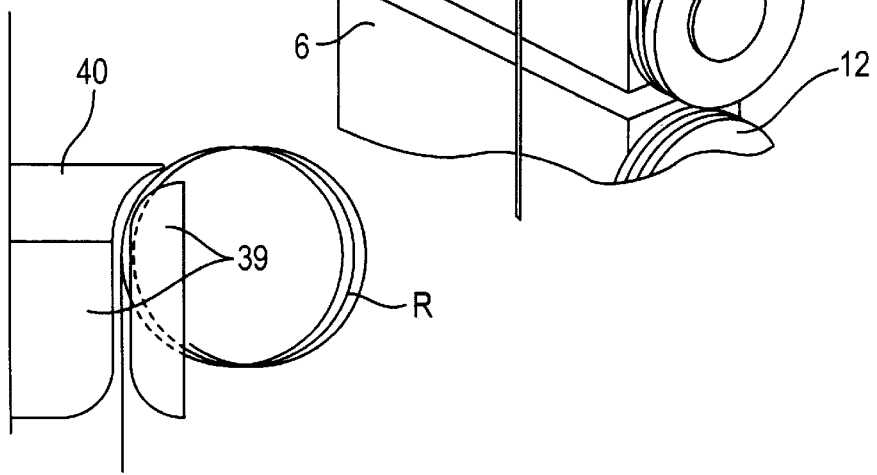

FIG. 7
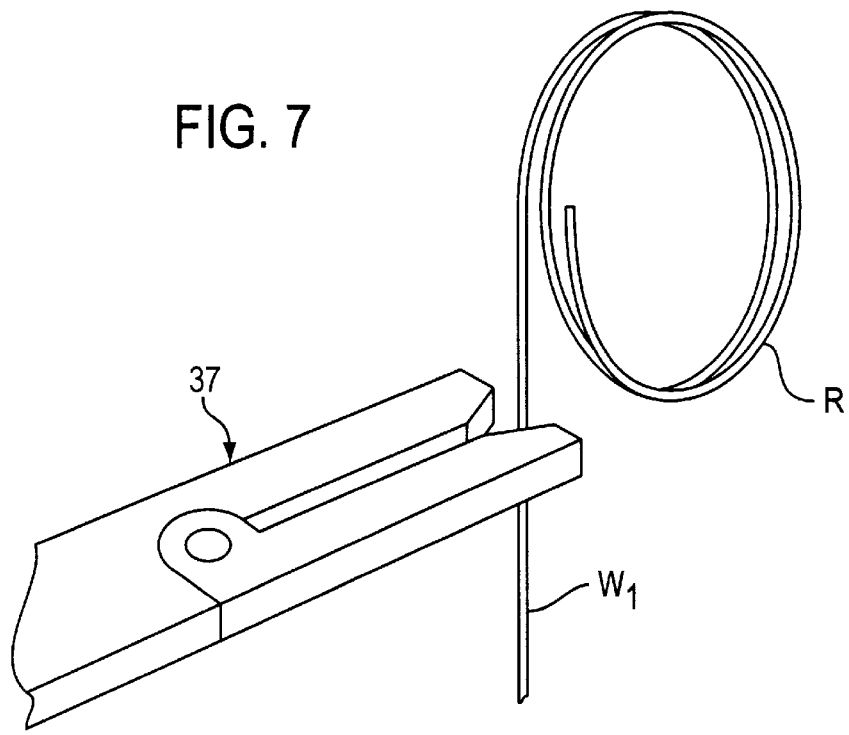
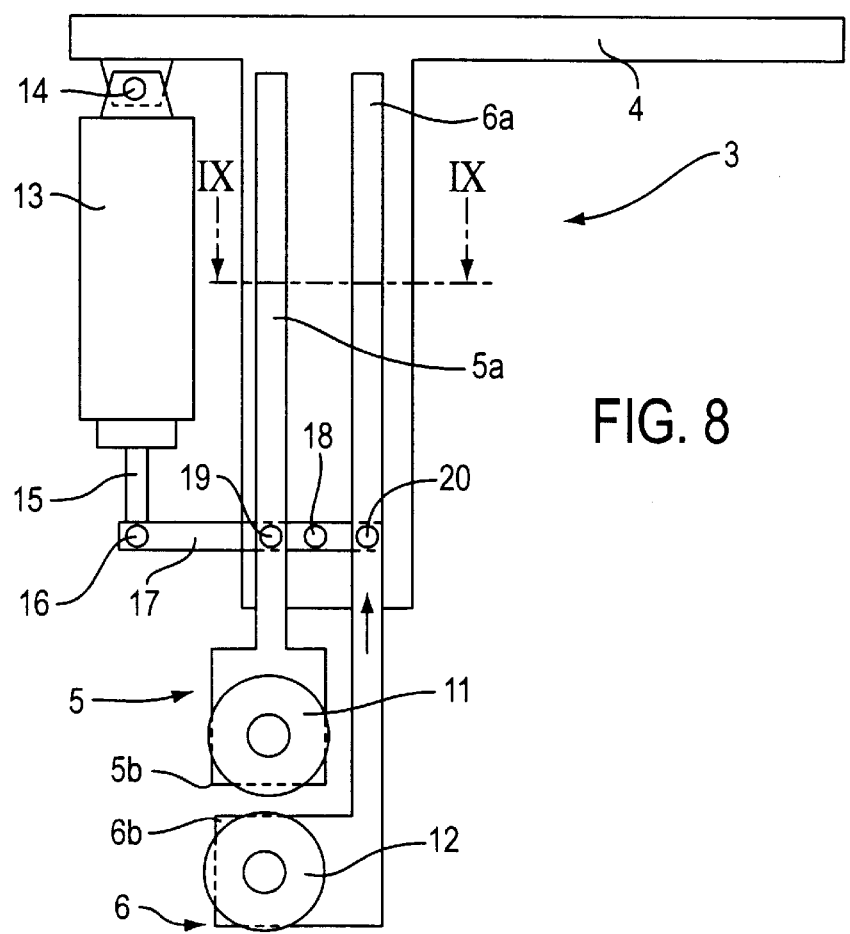
FIG. 8

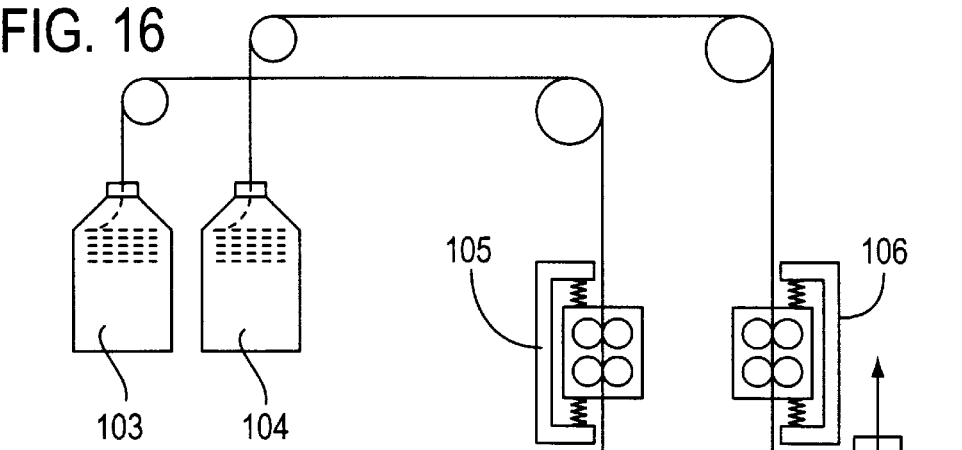
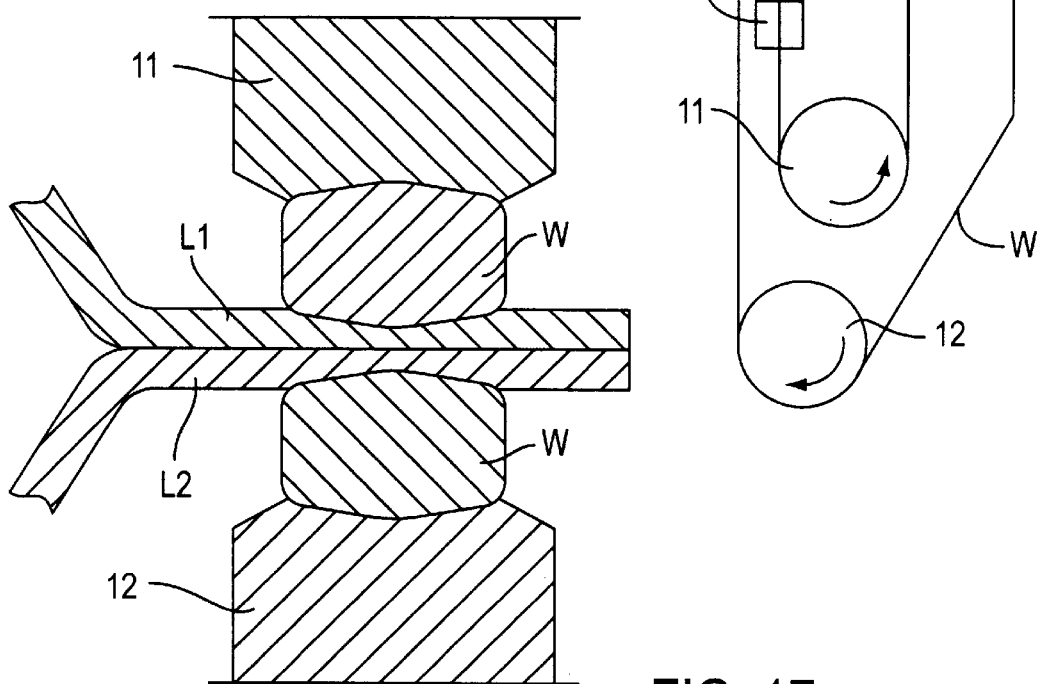
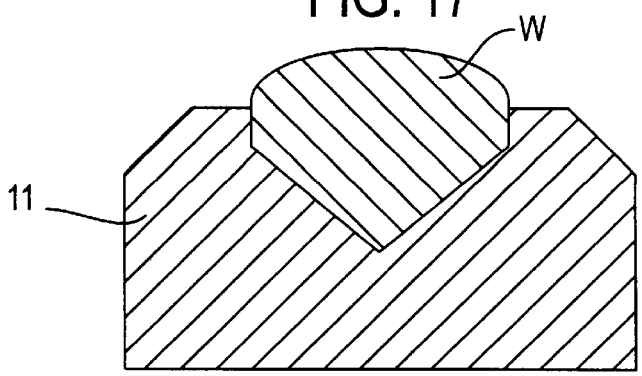

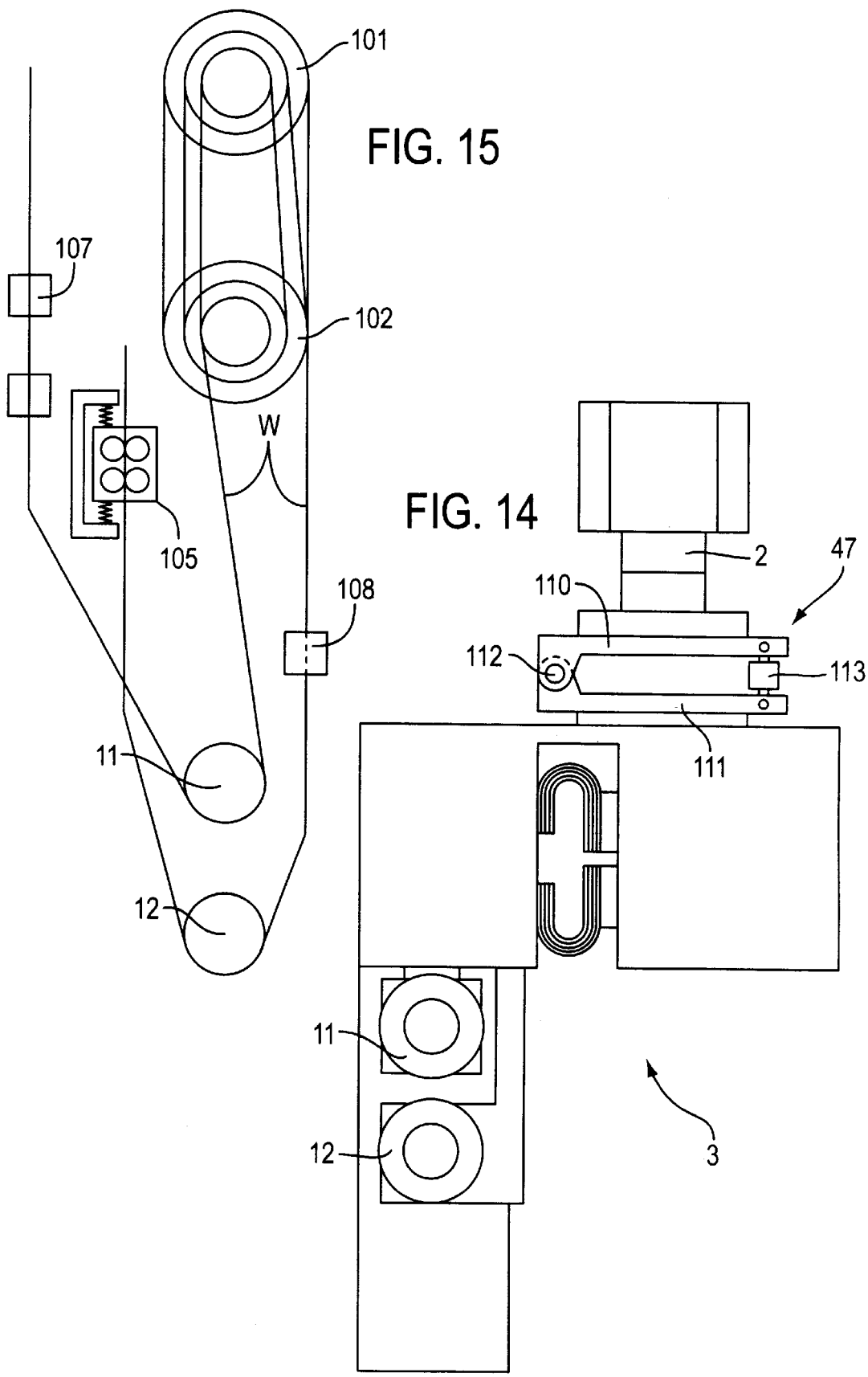

DEVICE FOR WELDING MOTOR-VEHICLE BODIES OR SUB-ASSEMBLIES THEREOF

BACKGROUND OF THE INVENTION

The present invention relates to devices for welding motor-vehicle bodies or sub-assemblies thereof, of the type comprising a supporting structure and a welding head connected to said supporting structure so as to be displaceable relative thereto.

According to the conventional technique, motor-vehicle structures are comprised of sheet metal elements assembled to each other by electric spot welding. To this end, the elements to be welded have juxtaposed flanges, which are welded to each other, after that the elements are locked in the proper assembling position, by applying a plurality of electric welding spots, which are carried out by welding heads which for example are carried by programmed robots in order to reach all the various parts of the structure to be welded.

In recent times, the need has been more and more felt in the automotive industry of reducing as much as possible the weight of the structure, without of course jeopardising the strength thereof.

The assembling technique of car bodies by spot welding poses limits to the possibility of solving the aforesaid problem satisfactorily. As a matter of fact, this technique brings a decrease in the strength of the structure, both because the resisting cross-section in the welding area is lower than that of the original metal sheet, and above all because stress concentrations are created at the welding spots. On the other hand, if one tries to compensate the decrease in strength by increasing the number of welding spots, the cost for carrying out welding is unacceptably increased. Further more, when the pitch of welding spots falls below values in the order of 25 mm, parasitic currents tend to occur which can not be easily controlled.

The above indicated problem can be overcome by providing continuous welds, instead of spots welds, since in this case it is possible to decrease the thickness of the sheet metal elements while keeping the same rigidity of the structure or, alternatively, it is possible to increase rigidity while keeping the same thickness.

In the endeavour to reach this object, studies and researches have been conducted by many for the use of laser welding heads. Thus far, however, these tries have not brought economically advantageous results, substantially for two reasons. Firstly, laser welding of superimposed sheets, which would be preferable (since it would not compel auto makers to change the criteria of design of the structures), requires systems for adjoining pieces to each other which have been shown to be difficult to work out and above all it can not be carried out when the metal sheets to be welded are zink-plated. Secondly, a change in the design criteria of the car body, which would allow a more advantageous use of the laser welding is not always approved by car designers. Lastly, a power welding system by laser has a relatively high cost.

SUMMARY OF THE INVENTION

The object of the present invention is that of providing a welding device for motor-vehicle bodies or subassemblies thereof which on one hand can be used simply and economically on body structures designed in the conventional way, and on the other hand is more advantageous with respect to the conventional system of spot welding with respect to the possibility of reducing the weight of the structure with the same strength or, vice versa, of strengthening the structure while keeping the same dimensions.

In view of achieving this object, the present invention provides a device for welding motor-vehicle bodies or subassemblies thereof comprising a supporting structure and a welding head connected to said supporting structure so as to be displaceable relative thereto, characterized in that said welding head is provided with
means for wire seam welding of the type, known per se, including a pair of counter-rotating welding rollers, means for supplying an electric current through said welding rollers and means for feeding continuously a copper wire around said welding rollers and in that said welding head is carried by a robot which is able to move said head along the elements to be welded of a motor-vehicle body or a subassembly thereof, to carry out continuous welding seams on said elements.

As indicated above, the technique of wire seam welding, using a pair of electrode rollers and a copper wire fed to these rollers so that it is interposed between each roller and the piece to be welded, is known per se and has been used for a long time in industry (see for example EP-A-296.345).

The basic concept of the present invention is that of applying said per se known technique to the welding of car bodies or subassemblies thereof, by providing a programmable robot carrying a welding head of the type which has been indicated above.

This new application of said per se known welding technique to the field of welding of motor-vehicle bodies brilliantly overcomes the above indicated problems. Indeed it provides for continuous welding seams of the elements forming the car bodies which is cheap and easy to be carried out, with a resulting increase of rigidity of the structure, while keeping the same dimensions, with respect to the case of a structure welded by spot welding. For the same reason, this technique allows structures to be provided formed by thinner metal sheets, and hence lighter, while keeping the same rigidity with respect to the case of spot welding.

It is still to be noted that in the automotive industry there has been already proposed in the past the use of a resistance welding with electrode rollers for carrying out welding of some parts of the car body (for example for connecting the roof to the side panels). However, this technique did not provide for the additional use of a copper wire fed to the electrode rollers. For this reason, the electrode rollers, which had a relatively small diameter in order to operate on the parts to be welded, were subject to rapid wear. Moreover, it was not possible to keep the welding seam with a width lower than a threshold of 5–6 mm, with a resulting high heating of the weld and a strong deformation of the car body. The strong wear of the rollers also posed limits of use in mass construction.

In the case of the present invention, the use of the copper wire avoids the rapid wear of the electrode rollers, which can be made relatively small, and the welding seam may be obtained with a very narrow cross section, thus determining a low thermal alteration of the surrounding sheet metal. The possible deformation of the car body due to heat is thus avoided.

According to a further feature of the invention, said means for feeding the copper wire to the welding rollers are able to feed the same wire firstly to a first welding roller, with a first side of the wire in contact with said first roller, and then to a second welding roller, with a second side of the wire, opposite to said first side, in contact with said second welding roller.

Due to this feature, the copper wire is used twice, with a resulting economic advantage, while ensuring that at each time it has its clean side against the metal sheet to be welded.

A further feature of the invention lies in that said means for feeding the copper wire includes means for tensioning the wire segment extending between the first and the second welding rollers in order to compensate for the strain of the wire caused by its passing on the first welding roller. This strain is due to yielding caused by the temperature increase due to welding and to the force exerted on the wire by the welding rollers.

Preferably, said tensioning means comprises a pulley on which the wire segment extending between the first and second welding rollers is guided, said pulley being displaceable to vary the distance between its axis and the axis of said first roller.

According to a further feature of the invention, at least one of the welding rollers is rotatably driven by a variable speed electric motor, carried by said welding head and connected to said roller with the interposition of a reducing gear. The other roller may also be positively driven in rotation by said electric motor or, alternatively, it may be driven in rotation by friction by a driving wheel rotatably connected to the powered roller.

A further feature of the invention lies in that said means for feeding the copper wire comprises a pair of wire drawing counter rotating rollers, arranged downstream, with respect to the direction of movement of the wire, of the welding rollers and driven by said electric motor by a transmission which provides a transmission ratio which is slightly lower than the transmission ratio between the electric motor and the welding rollers, so as to keep the wire downstream of the welding rollers under tension.

Preferably, with said drawing rollers there are associated torque limiting means to avoid that the tension on the wire segment downstream of the welding rollers passes a predetermined level.

An additional feature of the invention lies in that said head is provided with means for eliminating the wire segment used for carrying out welding, said means including a cutter arranged downstream, with respect to the direction of movement of the wire, of said drawing rollers. In a first embodiment, said wire eliminating means comprises also a container carried by said welding head and arranged to receive the wire segments cut by said cutter. In a second embodiment, said wire eliminating means comprises shaping means adapted to bend the wire so as to wind it in a curl-like fashion, before the cut is carried out by said cutter.

According to a further feature of the invention, said welding head comprises a supporting body and said welding rollers are rotatably mounted on two supporting members which are moveable on said supporting body to vary the distance between the axes of the welding rollers. There are further provided means for driving the movement of the members supporting the welding rollers, adapted to move said rollers simultaneously and symmetrically. In a particularly advantageous embodiment, said supporting members are slidably mounted on said supporting body along two parallel directions and said driving means comprises a fluid cylinder having a stem connected to said supporting members by a linkage which is adapted to cause a simultaneous and identical movement in two opposite directions of the two supporting members.

Still a further feature of the invention lies in that said means for electric supply to the welding rollers comprises an industrial frequence electric transformer or a high frequence electric transformer (to reduce weight) with a rectifier if necessary, mounted on the supporting body of the welding head, whose two output terminals are connected to said members supporting the welding rollers by means of flexible conductors.

Finally, an important feature of the invention lies in that said robot is provided with electronic control means for moving the welding head along the elements to be welded at such a speed that the resulting rolling speed of the welding rollers on said elements is substantially identical to the rotational speed of the welding rollers caused by said electric motors.

In a preferred embodiment, the robot is provided with a robot wrist on which the welding head is mounted and torque sensor means associated with said wrist and adapted to sense the reaction torque transmitted by said head to the robot wrist, said electronic control means being adapted for receiving the signals emitted by said sensor means and controlling said electric motor by a feed-back loop logic, to keep said torque below a predetermined value.

BRIEF DESCRIPTION OF THE DRAWINGS

Further feature and advantages of the invention will become apparent from the description which follows with reference to the annexed drawings, given purely by way of non limiting example, in which:

FIG. 5 is a further view, at an enlarged scale, of a detail of FIG. 4, FIG. 6 is a front view at a further enlarged scale, of a detail of FIG. 5, FIG. 7 is a perspective diagrammatic view of a further detail of the welding head according to the invention, FIG. 8 is a diagrammatic side view of a further part of the welding head according to the invention, FIG. 13 is a partial view in cross-section and at an enlarged scale of the two welding rollers with the respective wire portions in contact with two metal sheet to be welded, FIG. 14 diagrammatically shows the torque sensing device associated with the robot wrist, FIGS. 15, 16 show two variants of the copper wire feeding means, and FIG. 17 shows a cross-section of the wire used in the variants of FIGS. 15, 16.

DETAILED DESCRIPTION OF THE INVENTION

Figure 1:
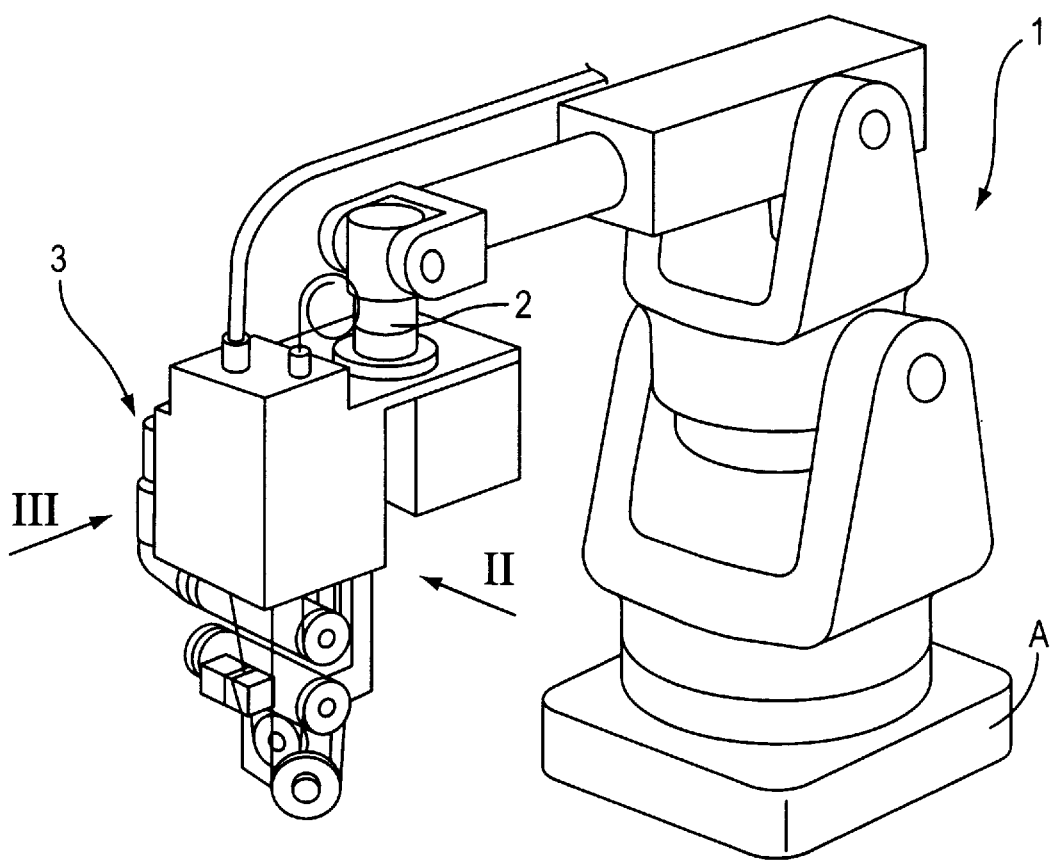
FIG. 1 is a perspective diagrammatic view of a robot used according to the present invention.

With reference to the drawings, reference numerals 1 generally designates an industrial robot whose wrist 2 carries a welding head 3 according to the present invention. In FIG. 1, the robot is shown only diagrammatically, since its structure can be made in any known way. Typically, robot 1 has a plurality of mutually articulated elements whose rotations are controlled by respective electric motors which are controlled by a computer according to a predetermined program in order to cause the welding head 3 to follow paths in space with respect to a supporting block A, for carrying out continuous welding seams on the surfaces of a motor-vehicle body or a sub-assembly thereof.

Figure 2:
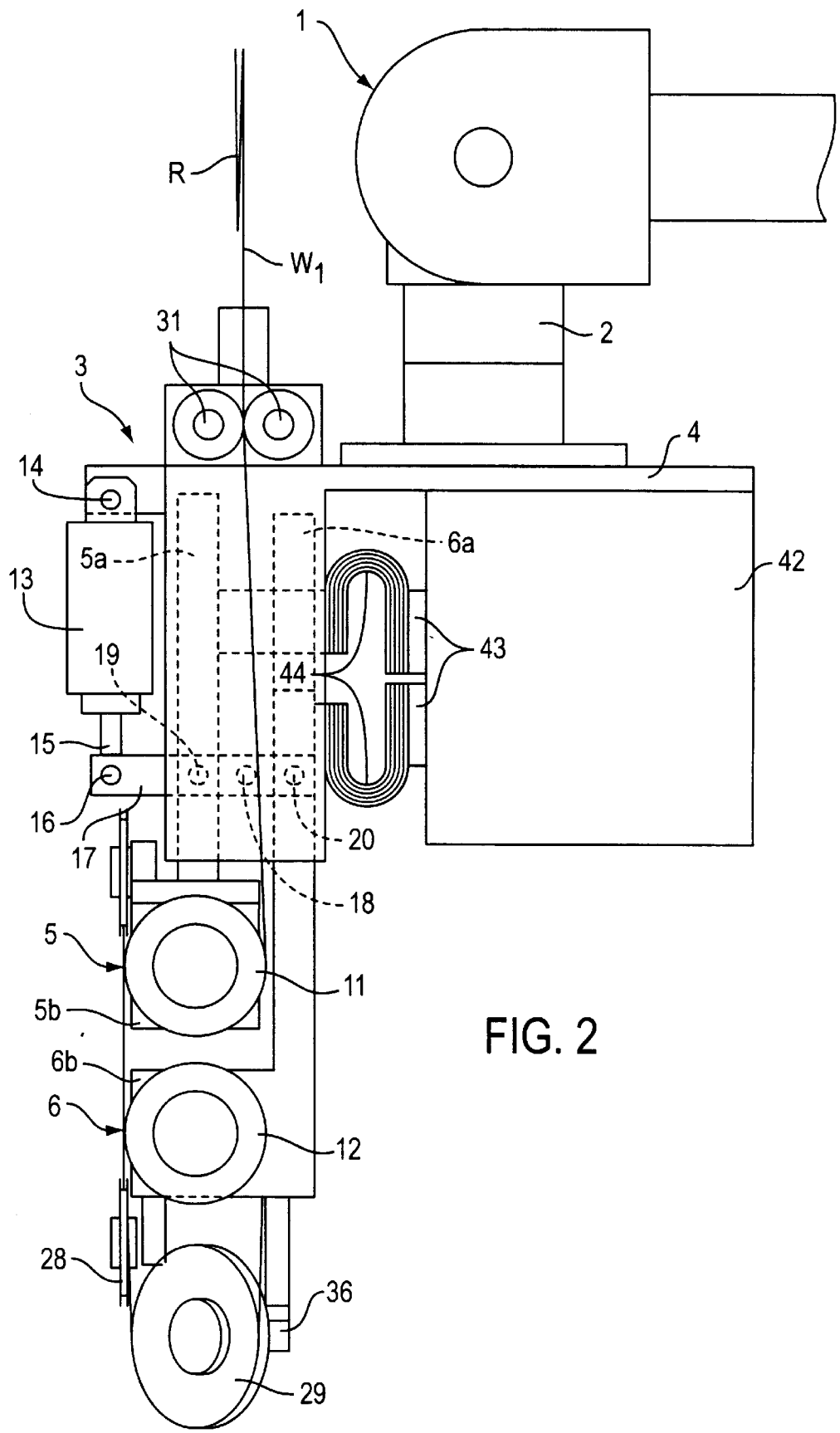
FIG. 2 is a side view of the welding head
Figure 9:
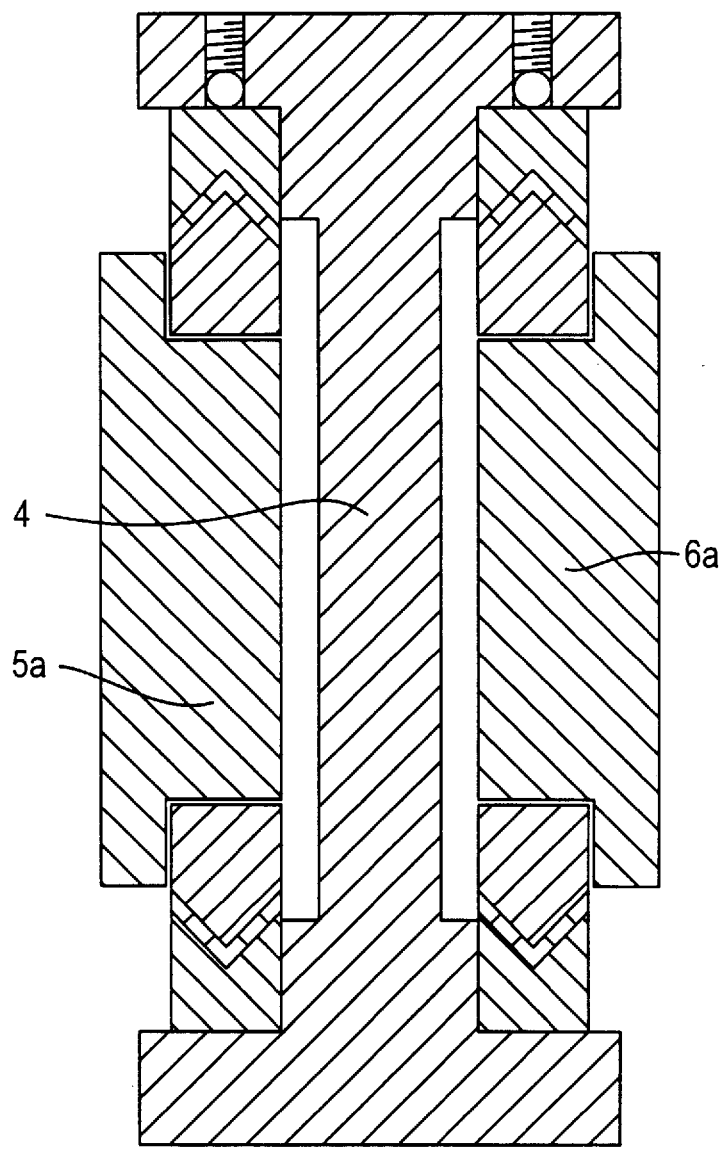
FIG. 9 is a cross-sectional view, at an enlarged scale, according to line IX—IX of FIG. 8.

With reference in particular to FIGS. 2–4 and 8, the welding head 3 has a supporting body 4 which is fixed to wrist 2. On the supporting body 4 there are slidably mounted, in the embodiment shown, two supporting members 5, 6 (FIGS. 2, 8 and 9). As visible in FIG. 9, the supporting members 5, 6 have two slide portions 5a, 6a, which are slidably mounted within guides 7, 8 carried by the supporting body 4. At their lower ends projecting outside of the supporting body 4, the two slide portions 5a, 6a end with two heads 5b, 6b which rotatably support two spindles 9, 10. Spindles 9, 10 carry at their ends a first welding roller 11, or upper roller, and a second welding roller 12, or lower roller, respectively.

Figure 3:
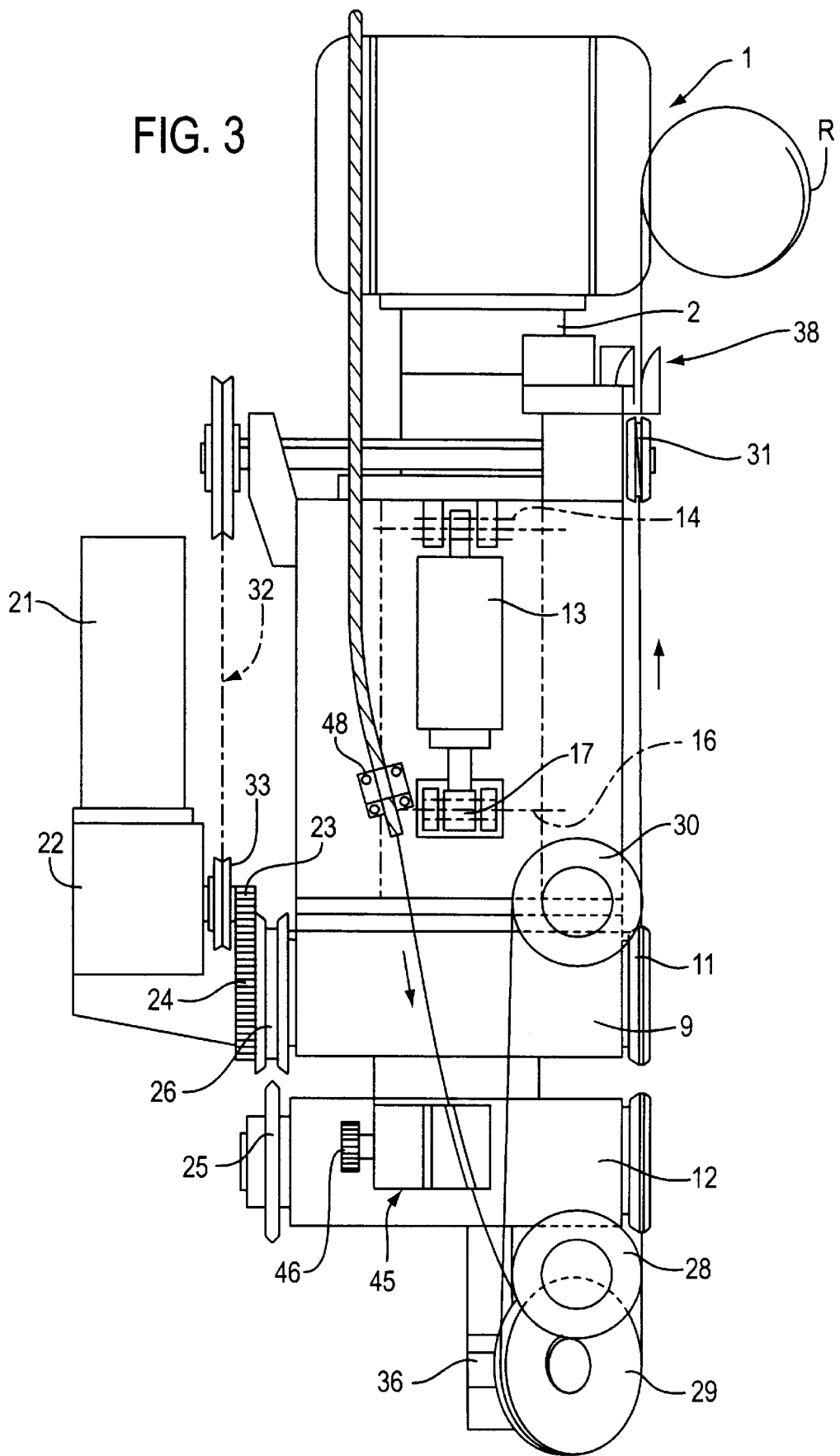
FIG. 3 is a front view of the welding head according to the invention, according to arrow III of FIG. 1.

Still with reference in particular to FIGS. 3, 8, the position of welding rollers 11, 12 is controlled by a fluid cylinder 13 whose body is articulated at 14 to the supporting body 4 of the welding head and whose stem 15 is articulated at 16 to a driving lever 17. Lever 17 is pivoted at 18 to the supporting body 4 and is articulated to the two slide portions 5a, 6a at two axes 19, 20 symmetrically arranged on opposite sides with respect to axis 18, so that each movement of stem 15 causes two simultaneous identical movements in opposite directions of the two slide portions 5a, 6a.

With reference to FIGS. 3, 5, spindle 9 carrying the first welding roller 11 is driven in rotation by a variable speed electric motor 21, by a reducing gear unit 22 and a pair of gears 23, 24. In the illustrated example, spindle 10 carrying the second welding roller 12, is instead driven in rotation by friction as a result of engagement of a driving wheel 25 which is rotatably connected to spindle 10 within a track 26 of spindle 9. However, it is also possible to provide for a connection between spindle 10 and the same motor 21 which drives spindle 9.

Figure 4:
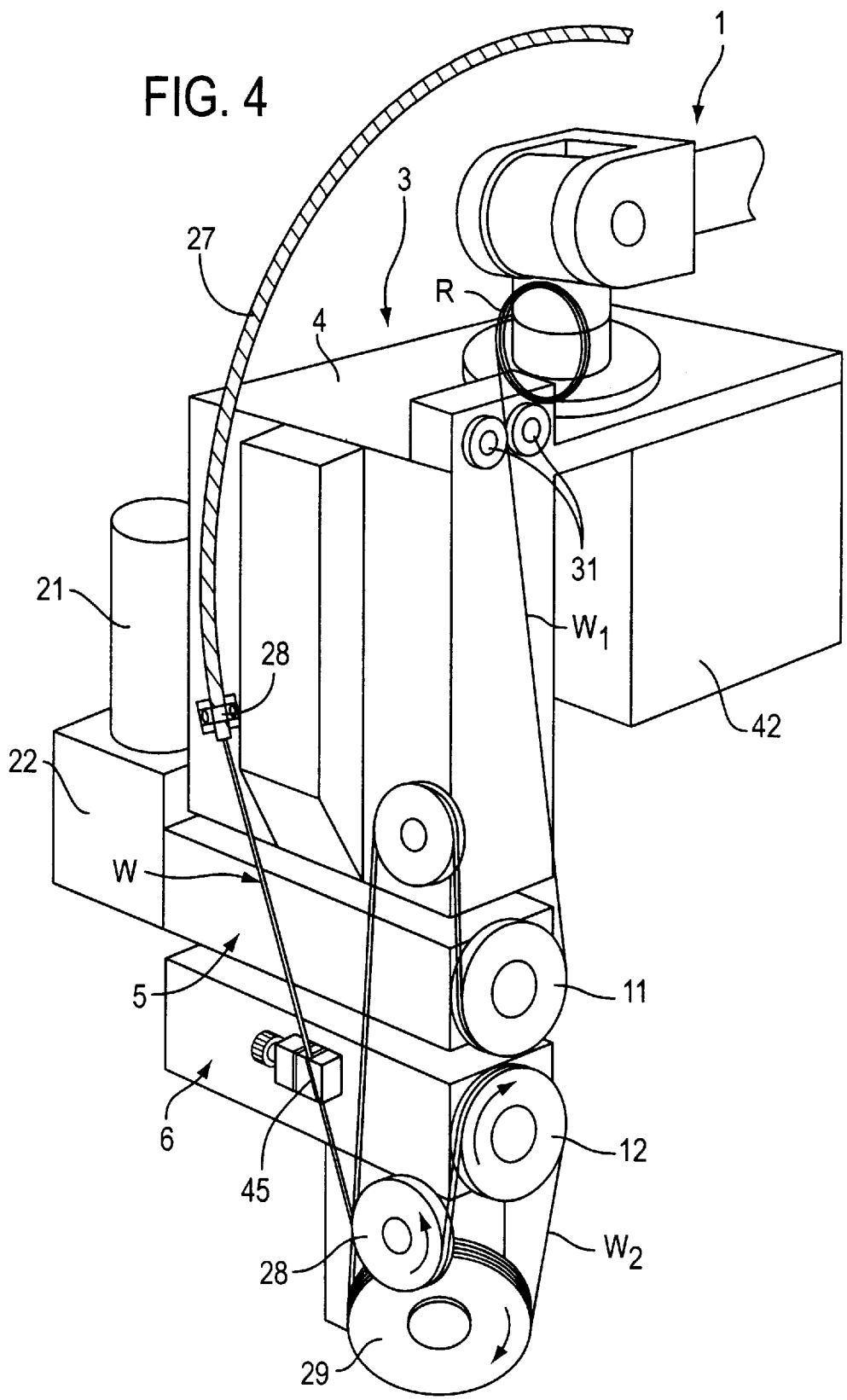
FIG. 4 is a perspective diagrammatic view, at an enlarged scale, of the welding head according to the invention.

With reference now to FIGS. 3, 4, a copper wire W is fed to the two electrode rollers 11, 12, within respective peripheral grooves provided on such rollers, so that this wire is interposed between each roller and the elements to be welded, against which the two rollers 11, 12 are pressed on opposite sides.

The copper wire W is fed by unwinding it from a feeding reel (not shown in the drawings) through a sheath 27 whose front end is fixed at 28 to the supporting body 4 of the welding head 3. FIG. 4 clearly shows the path followed by the cooper wire W, which, after it comes out of the sheath 27, is guided around a wheel 28 with a fixed axis, whereupon it passes over the welding roller 12 with a first side thereof facing this roller. After it has passed around the welding roller 12, wire W is guided around a pulley 29 with a moveable axis, which will be described more in detail hereinafter, whereupon it is fed through an idle wheel 30 with a fixed axis to the welding roller 11 so that against this roller there is its side opposite to that which was in contact with roller 12. Thus, when passing on welding rollers 11, 12, the wire W has always its clean side facing towards the elements to be welded.

The copper wire segment indicated by W1 in FIG. 4, which is arranged downstream (with reference to the direction of movement of the wire) of the welding rollers, is subject to tension exerted by the two counter rotating drawing rollers 31 which are rotatably mounted on the supporting structure 4.

With reference in particular to FIGS. 3, 6, the drawing rollers 31, or at least one of them, are driven in rotation through a belt transmission 32 comprising a belt with a trapezoidal cross-section which respectively engages a pulley 33 mounted on the output shaft of the reducing gear unit 22 and a pulley 34 connected by a shaft 35 to one of the drawing rollers 31. The same electric motors 21, therefore, provides for driving in rotation both electrode rollers 11, 12 and drawing rollers 31. However, the transmission ratio between motor 21 and drawing rollers 31 is chosen slightly lower than that between motor 21 and electrode rollers 11, 12 so as to tend to keep the wire segment W1 under tension. Preferably, with drawing rollers 31 there is associated a torque limiting device which provides to keep tension of wire segment W1 below a predetermined value, so as to avoid any risk of wire failure.

Still with reference to FIGS. 2–4, the moveable pulley 29 is rotatably mounted on a slide element 36 which is slidably mounted on the supporting members 6 and is controlled by a fluid cylinder (not shown) so as to keep the wire segment W2 and W3 (FIG. 4) between the two welding rollers 11, 12 under tension, in spite of the strain to which wire W is subject as a result of its passing on roller 12. This strain is determined both by the heating due to welding, and by the pressure exerted on the wire by the welding roller 12, which presses the wire against the element to be welded.

It is still to be noted that the axis of rotation of pulley 29 lies in a plane parallel to the axes of rollers 11, 12 and forms an angle with respect to these axes, so as to assume the inclined position shown in the drawings.

At the end of the operation for carrying out a welding seam, the portion of used wire W1 which is downstream of the drawing roller 31 is eliminated by a cutter 37 (FIG. 7) which provides for its cutting. In order to reduce the bulk of the wire portion to be eliminated during the robot movements, the welding head is preferably provided with a shaping device 38 arranged downstream of the drawing rollers 31, which gives to wire W1 a curvature such that it assumes a curled configuration R. As visible in FIGS. 5, 6, the shaping device 38 has two fixed dies 39 and a moveable die 40 driven by a fluid cylinder 41 and moveable between the opened position shown in FIG. 5, in which wire W remains unaffected and straight, and a closed configuration (FIG. 6) in which it gives toward the wire the curvature which determines the shaping of curl R. At the end of the seam welding operation, curl R is eliminated by cutter 37, before proceeding to a new welding seam.

Alternatively, in lieu of said shaping means 38, it is possible to provide for a container arranged for receiving the straight wire segment cut by cutter 37, which container may be emptied from time to time.

Figure 10:
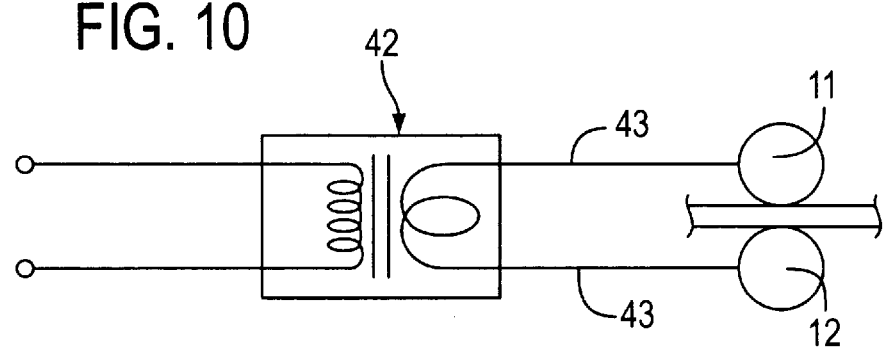
FIG. 10 is an electric diagram of the electric supply circuit for the welding head according to the invention.
Figure 11:
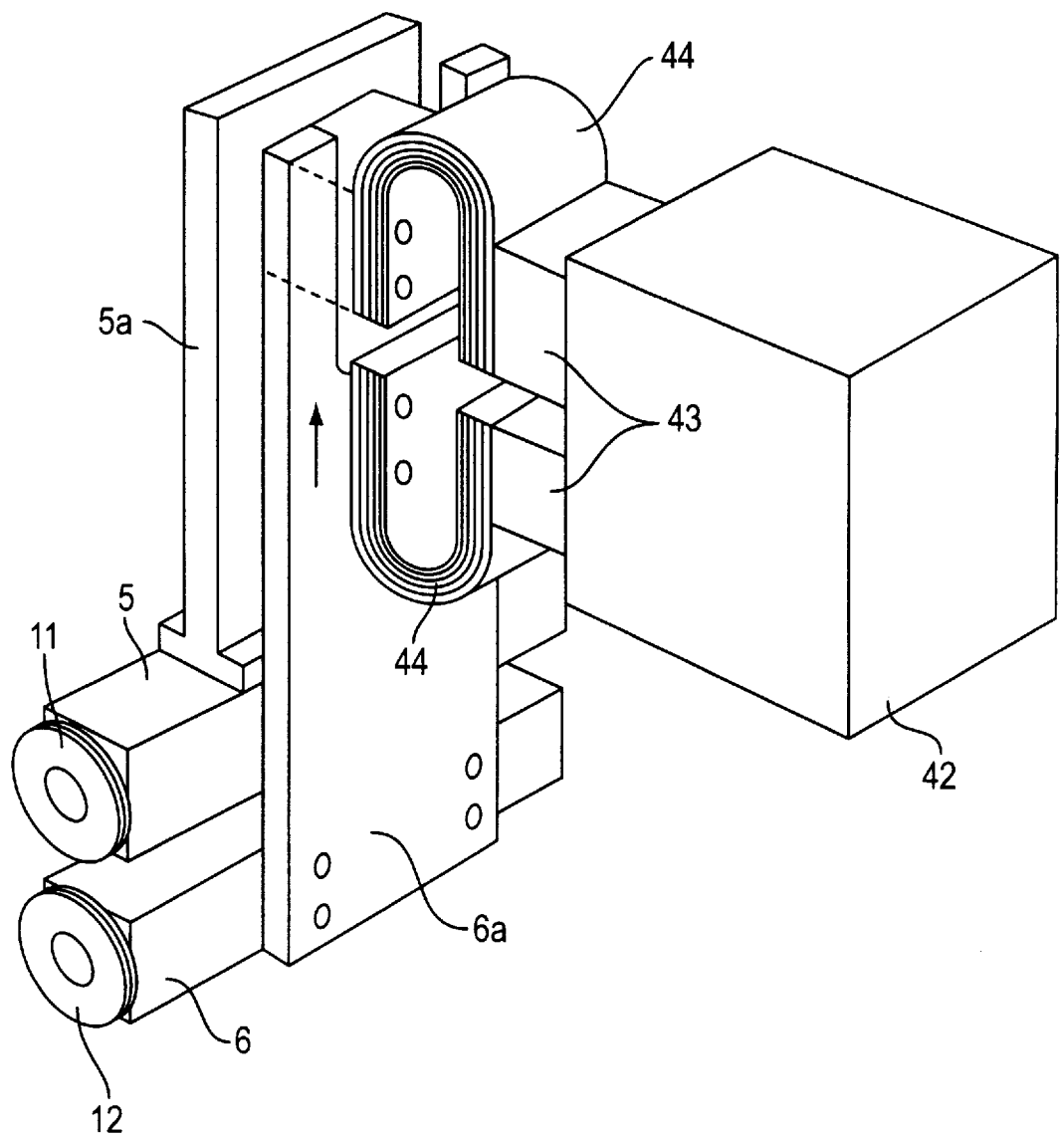
FIG. 11 is a further perspective view, at an enlarged scale, of a further detail of the head according to the invention.

With reference now to FIGS. 10, 11 and 2, the electric supply circuit for electrode rollers 11, 12 comprises a supplying electric transformer 42 (which can be a 50Hz transformer or a high frequency transformer, with or without rectifier) which is mounted on board of the supporting body 4 of the welding head and has its output contacts 43 connected by flexible lief conductors 44 to the two slide portions 5a, 6a and, through these, to spindles 9, 10 and electrode rollers 11, 12.

In operation, robot 1 is driven to move the two electrode rollers 11, 12 along the surfaces of the sheet metal elements to be welded, so as to provide a continuous welding seam on these elements. During the welding operation, the electrode rollers are supplied with electric current in the above indicated way and pressed against the element to be welded by fluid cylinder 13 which controls position of supporting members 5, 6 carrying the roller driving spindles. Electric motor 21 provides for driving in rotation one or both welding rollers 11, 12 and also drawing rollers 31 which exert the tension on copper wire W necessary for feeding it to electrode rollers 11, 12. The movement of wire out of the sheath 27 is controlled by a friction device 45 which can be adjusted by a screw 46 (FIG. 3). As already indicated, during welding, moveable pulley 29 keeps the cooper wire portion extending between the two electrode rollers under tension in spite of the strain to which this wire is subject as a result of its passing on the first roller.

Due to the above indicated features, the device according to the invention is able to carry out continuous welding seams on the sheet metal elements constituting a motor-vehicle body or a subassembly thereof, in a simple an economic way, and ensuring a high rigidity is achieved. Therefore, it is possible to decrease the thickness of the sheet metal elements, while keeping the same rigidity, with respect to the case of a spot welded structure, or to increase the rigidity of the structure while keeping the same dimensions of the components.

Figure 12:
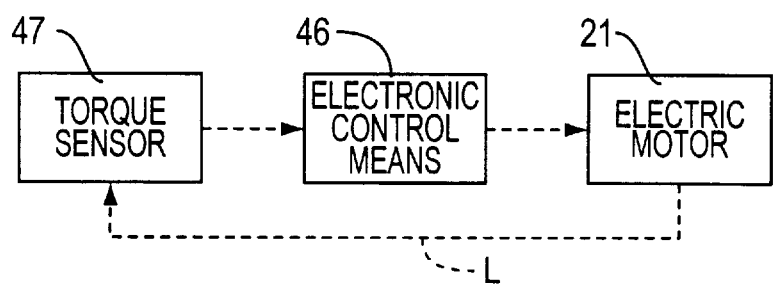
FIG. 12 is a block diagram showing the operation of the electronic control means of the robot according to the invention.

In order to avoid undesired stresses on the robot wrist, the device according to the invention is also able to cause the rolling speed of electrode rollers 11, 12 on the elements to be welded, originated from that the welding head 3 is displaced along these elements by robot 1, to be substantially equal to the rotational speed at which these rollers are driven by the variable speed electric motor 21. Preferably, to this end, the electronic control means of robot 1 (diagrammatically indicated by 46 in FIG. 12) are able to control the speed of electric motor 21 as a function of signals received from a sensor 47 placed on wrist 2 of the robot and able to detect the reaction torque of the welding head 3 on the wrist. The electronic means 46 are able to operate electric motor 21 according to a feed back loop L to cause said reaction torque to be kept constantly below a predetermined value, which corresponds to achievement of the above described ideal condition, in which the rotational speed which is imparted to electrode rollers 11, 12 by motor 21 corresponds to the rolling speed at which these rollers would be subject as a result of the movement of the welding head 2 along the elements to be welded.

FIG. 13 shows in cross-section and at an enlarged scale the welding area of two metal sheet L1, L2 during use of the robot according to the invention. As shown, the cross-section of wire W is symmetrical, to allow for use of the wire on both sides thereof.

FIG. 15 refers to a variant in which the two welding rollers 11, 12 are fed with the same copper wire W which however is used always on a same side. In this case, the cross-section of wire may be of the type shown in FIG. 17. In this variant, the wire W, after it has passed on roller 12, is wound many times on idle wheels 101, 102 so as to store a wire length grater than that used at each welding cycle, before it is fed to roller 11. In this way, during each welding, the exhausted wire which has passed on roller 10 cannot arrive in time at roller 11. During waiting time intervals between each welding and the other, the wire is advanced so as to bring the section exhausted by roller 12 beyond roller 11, to allow for its elimination. Therefore, during each welding, each roller 11, 12 is always affected by a new section of wire W.

FIG. 16 relates to a variant in which there are provided two different wires W1, W2 which are picked up from two reels 103, 104, are caused to pass through two shaping devices 105, 106 and then are fed to the two rollers 11, 12 by drawing devices 107, 108.

FIG. 14 shows an embodiment of the torque sensor 47 interposed between wrist 2 of the robot and welding head 3. It comprises two levers 110, 111 respectively fixed to wrist 2 and head 3. The levers are articulated at 112 at one end and connected to each other at the opposite ends by a load sensor 113, for example a strain gauge, able to emit a signal indicating any tension or compression, which is then used to pilot the motor driving rollers 11, 12 according to what has been shown with reference to FIG. 12.

Naturally, while the principle of the invention remains the same, the details of construction and the embodiments may widely vary with respect to what has been described and illustrated purely by way of example, without departing from the scope of the present invention.

What is claimed is:

1. Device for welding motor-vehicle bodies or subassemblies thereof, comprising a supporting structure (A) and a welding head (3) connected to said supporting structure (A) so as to be displaceable relative thereto, characterized in that said welding head (3) is provided with wire seam welding means, of the type, known per se, including a pair of counter-rotating welding rollers (11, 12), means (13) for pressing said rollers (11, 12) against the elements to be welded, means (4244) for supplying an electric current through said welding rollers (11, 12) and means (31) for feeding continuously a copper wire (W) around said welding rollers (11, 12), and in that said welding head (3) is carried by a robot (1) which is able to move said head (3) along the elements to be welded of a motor-vehicle body or a subassembly thereof, to provide a continuous welding seam of these elements.

2. Device according to claim 1, characterized in that said means for feeding a copper wire (W) to the welding rollers (11, 12) are able to feed the same wire firstly to a first welding roller (12) with a first side of the wire (W) in contact with said first roller (12), and then to a second welding roller (11), with a second side of the wire (W), opposite to said first side, in contact with said second welding roller (11).

3. Device according to claim 2, characterized in that said means for feeding copper wire (W) include means (29) for tensioning the wire portion (W2, W3) extending between the first and second welding rollers (12, 11) to compensate for the strain of the wire (W) caused by its passing on the first welding roller 12.

4. Device according to claim 3, characterized in that said tensioning means comprises a pulley (29) on which there is guided the wire portion (W) extending between the first and second welding rollers (12, 11), said pulley being moveable to vary the distance between its axis and the axis of said first roller (12).

5. Device according to claim 2, characterized in that at least one of the two welding rollers (11, 12) is driven in rotation by a variable speed electric motor (21) carried by said welding head (3) and connected to said roller with the interposition of a reducing gear unit (22).

6. Device according to claim 5, characterized in that said means for feeding copper wire (W) comprises a pair of counter rotating wire drawing rollers (W) arranged downstream, with respect to the direction of movement of the wire (W), of the welding rollers (11, 12) and driven by said electric motor (21) by a transmission (32) which provides a transmission ratio slightly lower than the transmission ratio between the electric motor (21) and the welding roller (11, 12), so as to keep the wire (W1) downstream of the welding rollers (11, 12) under tension.

7. Device according to claim 6, characterized in that with said drawing rollers (31) there are associated torque limiting means to avoid that the tension on the wire portion (W1) downstream of the welding rollers (11, 12) passes a predetermined level.

8. Device according to claim 7, characterized in that said head is provided with means (37) to eliminate the wire portions (W1) used to carry out a weld, said means including a cutter arranged downstream, with respect to the direction of movement of the wire (W), of said drawing rollers (31).

9. Device according to claim 8, characterized in that said wire eliminating means comprises a container carried by said head (3) arranged for receiving the segments of wire cut by said cutter (37).

10. Device according to claim 9, characterized in that said wire eliminating means comprises shaping means (38) adapted to bend the wire so as to cause it to wind in a curl-like fashion (R) before the wire is cut by said cutter (37).

11. Device according to claim 1, characterized in that said head (3) comprises a supporting body (4), in that said welding rollers (11, 12) are rotatably mounted on two supporting members (5, 6) moveable on said supporting body (4) to vary the distance between the axes of the welding rollers (11, 12) and in that there are provided means (13) for driving movement of the members (5, 6) supporting the welding rollers (11, 12), able to move said rollers (11, 12) simultaneously and symmetrically.

12. Device according to claim 11, characterized in that said supporting members (5, 6) are slidably mounted on said supporting body (4) along two parallel directions and said driving means comprises a fluid cylinder (13) having a stem (15) connected to said supporting members (5, 6) by a linkage (17) which is able to cause a simultaneous identical movement in opposite directions of the two supporting members (5, 6).

13. Device according to claim 11, characterized in that said means for electric supply to the welding rollers (11, 12) comprises an electric transformer (42) mounted on the supporting body (4) of the welding head (3), whose two output terminals (43) are connected to said supporting members (5, 6) of the welding rollers (11, 12) by flexible conductors (44).

14. Device according to claim 5, characterized in that said robot is provided with electronic control means (46) which provide for displacement of the welding head (3) along the elements to be welded at such a speed that the resulting rolling speed of the welding rollers (11, 12) on said elements is substantially identical to the rotational speed of the welding rollers caused by said electric motor (21).

15. Device according to claim 14, characterized in that said robot (1) is provided with a robot wrist (2) on which there are mounted said welding head (3) and said torque sensor means (47) associated with said wrist (2) for detecting the reaction torque transmitted by said head (3) to the robot wrist (2), said electronic control means (46) being able to receive signals emitted by said sensor means (47) and to control said electric motor (21) according to a feed-back loop logic (L) to keep said torque below a predetermined value.

16. Device according to claim 1, characterized in that said means for feeding copper wire (W) to the welding rollers (11, 12) are able to feed the same wire firstly to a first welding roller (12) with a first side of the wire (W) in contact with said first roller (12), and then to a second welding roller (11), with the same first side of the wire (W) in contact with said second welding roller (12), the wire portion extending between the two welding rollers having a length greater than the wire length used at each welding cycle.

17. Device according to claim 16, characterized in that the wire portion extending between the two welding rollers is stored by winding the wire around idle wheels before feeding the wire to the second roller.

18. Device according to claim 1, characterized in that said means for feeding copper wire (W) to the welding rollers (11, 12) are able to feed two different wires to the two welding rollers.

19. Device according to claim 15, characterized in that said torque sensor means (47) are interposed between the robot wrist and the welding head and comprises two levers articulated to each other at one end and fixed respectively to said robot wrist and said welding head, as well as a load sensor connecting the free ends of the levers and able to emit a signal indicating the stress to which it is subjected.

* * * * *